UNITED STATES PATENT OFFICE.

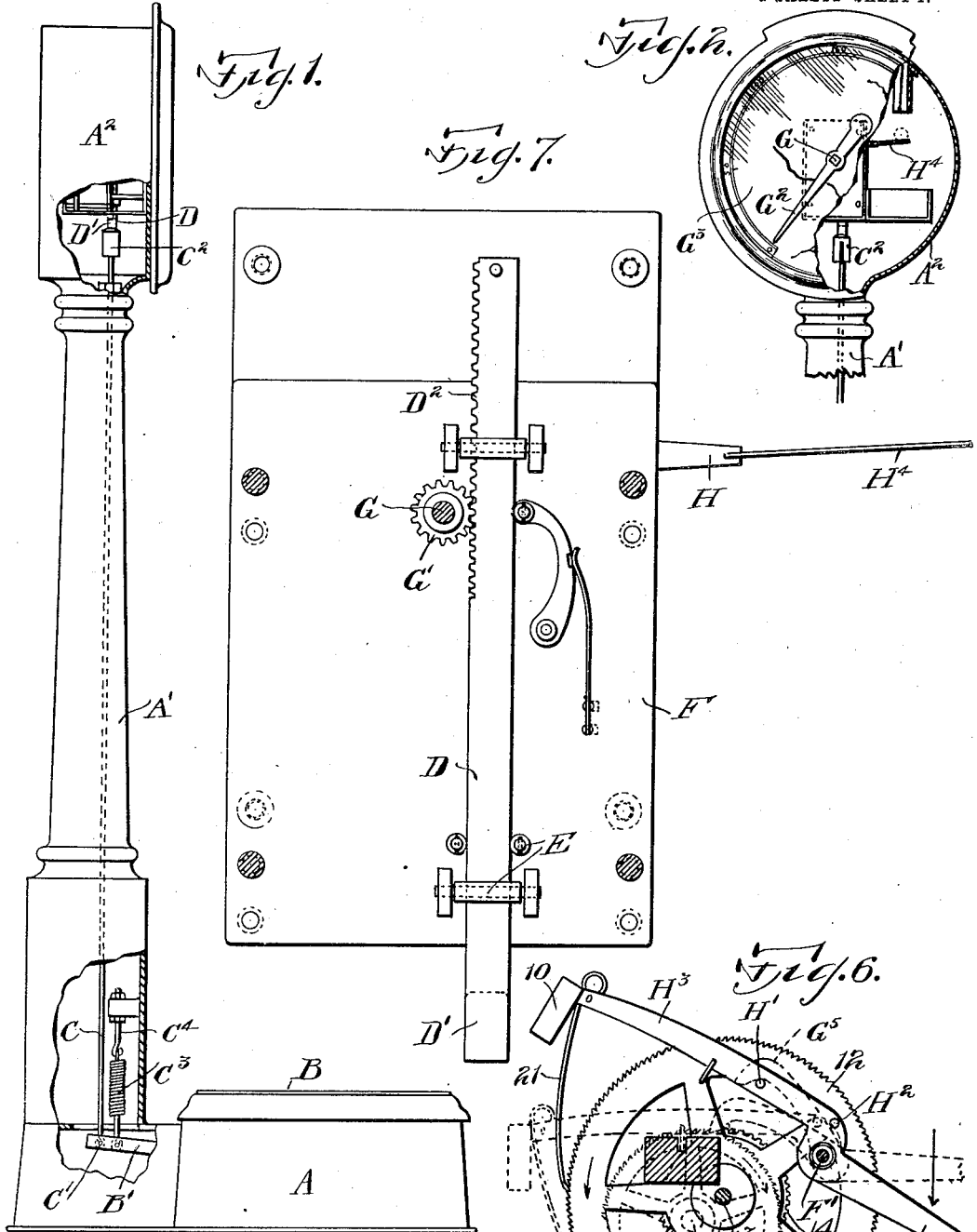

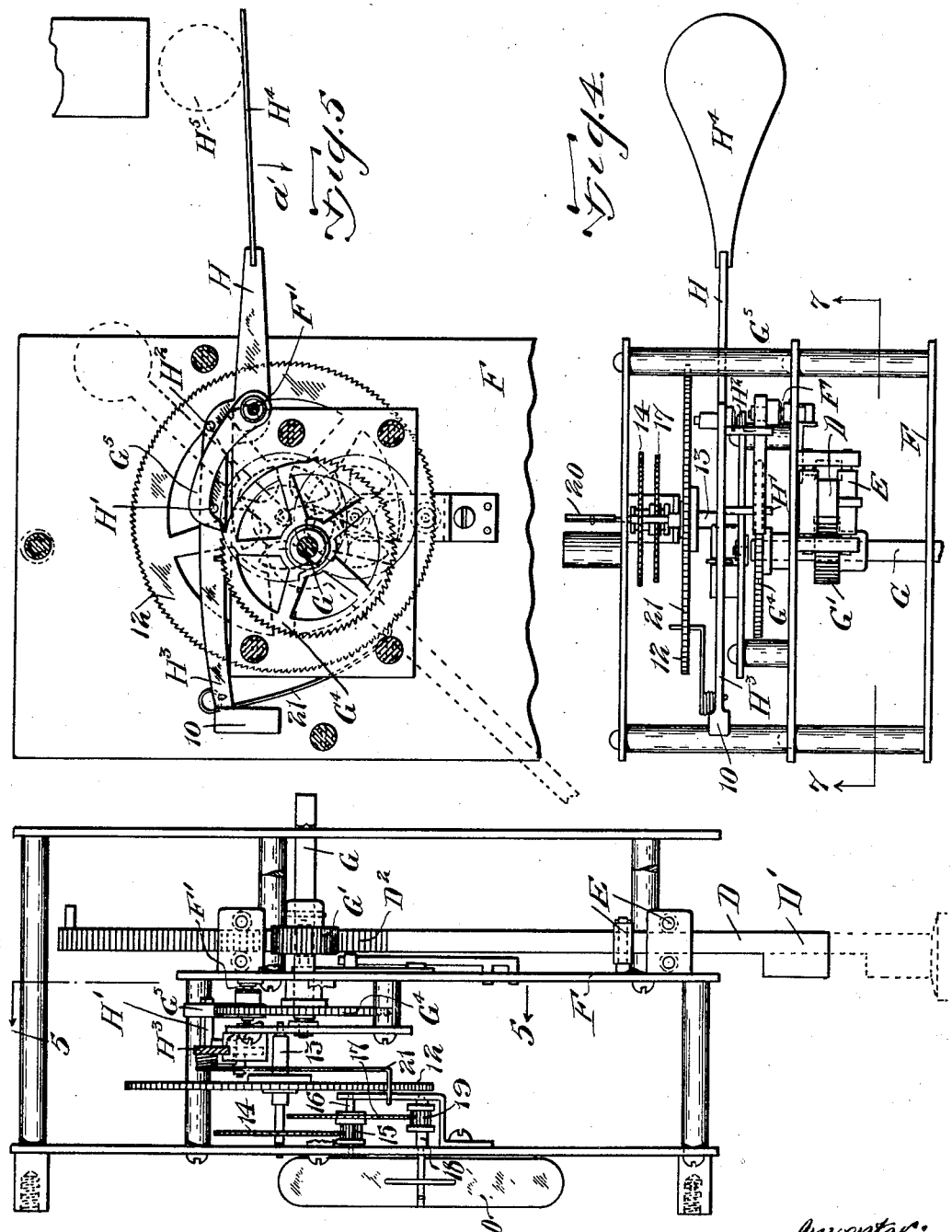

JAMES M. CHAPPEL, OF NEW YORK, N. Y., ASSIGNOR TO CHARLES S. MARSH, OF WINCHESTER, MASSACHUSETTS.

WEIGHING-MACHINE.

1,021,134. Specification of Letters Patent. Patented Mar. 26, 1912.

Application filed December 27, 1910. Serial No. 599,571.

*To all whom it may concern:*

Be it known that I, JAMES M. CHAPPEL, of New York city, in the county of New York and State of New York, have invented certain new and useful Improvements in Weighing-Machines, of which the following is a specification.

This invention relates to weighing machines of the type shown in Letters Patent of the United States, No. 970,465, dated September 20, 1910, the machine being of such construction that the weight of a person or other object standing on the weighing platform is displayed by a pointer on the dial and seen after the introduction of the proper coin.

The invention has for its object to substitute for the time mechanism described in the above-mentioned Letters Patent for holding the lever and pawl which lock the pointer to indicate the weight on the platform in a raised or inoperative position for a predetermined length of time, a simpler and less expensive mechanism for accomplishing the same results.

The invention consists in the improvements which I will now proceed to describe and claim.

Of the accompanying drawings which form a part of this specification,—Figure 1 represents a side elevation of a weighing machine embodying my invention, parts of the casing being broken away and shown in section; Fig. 2 represents a front elevation of a portion of the casing, parts being broken away and shown in section; Fig. 3 represents a side elevation of the coin-controlled pointer mechanism; Fig. 4 represents a top plan view of the same; Fig. 5 represents a section on line 5—5 of Fig. 3; Fig. 6 represents a section similar to Fig. 5 showing the lever and pawl in different position; and Fig. 7 represents a section on line 7—7 of Fig. 4.

Similar reference characters indicate the same or similar parts in all of the figures.

On the hollow base A, of the casing of the machine is mounted a movable scale platform B, adapted to be depressed by the weight of a person or other object standing or placed on the said platform B, the latter being connected with the usual multiplying mechanism located in the base A and including a lever B' having a knife edge trunnion $B^2$ engaging a hook C' on the lower end of a rod C carrying at its upper end an anvil $C^2$, the rod extending into the hollow standard A' erected on the base A, and the rod terminating in a circular casing $A^2$ containing the coin-controlled operating mechanism and the time-limiting mechanism hereinafter more fully described. The rod C and the anvil $C^2$ are normally held in raised position by a tension spring $C^3$ engaged at its lower end with the lever B' and at its upper end with a hook $C^4$, adjustably secured to the standard A'. By the arrangement described the tension of the spring $C^3$ can be regulated. Now, when a person steps on the platform B, a downward swinging motion is given to the lever B' which pulls the rod C and its anvil $C^2$ in a downward direction against the tension of the spring $C^3$, the extent of the depression of the platform B and of the rod C and its anvil $C^2$ being dependent on the weight of the person, as is well known in weighing machines of this type. The anvil $C^2$ governs the extent of the movement of a plunger D, mounted to slide up and down in suitable roller guideways E, mounted on a frame F secured within the circular casing $A^2$. The plunger D is provided with an offset D', adapted to abut against the lower end of a portion of the frame F, to limit the upward sliding movement of the plunger D, the downward movement being limited by the anvil $C^2$. The plunger D is provided with a rack $D^2$ in mesh with a pinion G' secured on the pointer shaft G journaled in the frame F, and on the said pointer shaft G is secured a pointer $G^2$, indicating on a dial $G^3$, held on the front face of the circular casing $A^2$ (see Fig. 2). The plunger D is normally locked in its raised position and for this purpose a mutilated ratchet wheel $G^4$ is secured on the pointer shaft G and is engaged by a pawl $G^5$ fulcrumed at F' on the frame F.

Coin-controlled mechanism is provided for raising or tripping the pawl $G^5$ and thus releasing the ratchet wheel $G^4$ and the plunger D to permit the descent of the latter. The coin-controlled mechanism comprises a two-armed lever H fulcrumed at F' on the frame F and provided with a transversely extending pin H' engaging the under side of the pawl $G^5$ to lift the latter out of engagement with the ratchet wheel G⁴ at the time the lever H swings in the direction of the arrow a'. A pin H² on the lever H limits the swinging movement of the pawl relative to the lever H, the front end H³ of the latter being weighted so as to normally hold the lever H in lowermost position, as indicated in Fig. 5. The rear end of the lever H is provided with a seat H⁴ extending under a coin chute so that a coin H⁵ dropping down the said chute encounters the seat H⁴, to swing the lever H in the direction of the arrow a', thus imparting an upward swinging movement of the pawl G⁵ for the latter to release the ratchet wheel G⁴ and the plunger D as before mentioned.

The mechanism thus far described is practically the same as that set forth in the above-mentioned Letters Patent for the purposes stated. In carrying out the present invention I have substituted for the motor driven time mechanism shown in said patent as the means for temporarily holding the lever H and pawl G⁵ in a raised position and the pawl disengaged from the ratchet G⁴, a simple form of retarding mechanism which causes the lever and pawl to descend slowly from the position shown in Fig. 6 to that shown in Fig. 5. Said retarding mechanism comprises a ratchet 12 of relatively large diameter attached to a shaft 13, a gear 14 attached to the shaft 13, a pinion 15 meshing with the gear 14 and attached to a shaft 16, a gear 17 also attached to the shaft 16, and a shaft 18 having a pinion 19 meshing with the gear 17, and a fan governor 20 adapted, by the resistance of the air to its rotation, to retard the rotation of the ratchet 12 through the intermediate gearing. The weighted arm H³ of the lever H is provided with a supporting pawl 21 adapted to engage the teeth of the ratchet 12, said teeth being so formed that when the weighted arm is raised the tooth engaged with the pawl 21 will oppose downward movement of the arm and of the pawl G⁵, said pawl temporarily supporting the weighted arm in a raised position.

The weight of the lever arm H³ (which is preferably provided with an enlargement 10 constituting a weight) is sufficient to overcome the resistance offered by the fan 20 to the rotation of the ratchet 12, so that when the arm is elevated, it descends with the pawl at a relatively slow rate due to the described retardation of the rotation of the ratchet 12. The fan 20 and weight 10 may be so proportioned that any desirable predetermined period may elapse before the pawl G⁵ is brought into engagement with the ratchet G⁴, about eight seconds being the preferred period.

The ratchet G⁴ being locked by the pawl G⁵, as shown by Fig. 5, the machine is in readiness for the weighing operation. The depression of the outer arm of the lever H by a coin dropping upon it simultaneously raises the weighted arm H³ and the pawl G⁵. The person operating the machine having mounted the platform B, before depositing the coin, causes the depression of the anvil C², so that the plunger D, which is now released and free to act, drops as far as the depression of the anvil will permit. The elevation of the weighted arm H³ causes the pawl 21 to slide upwardly over a portion of the periphery of the ratchet 12 and engage a tooth of the ratchet when the upward movement of the arm H³ ceases. The said arm and the pawl G⁵ descend slowly, as above described, the ratchet G⁴ being loose until the pawl descends to engagement with it, occurring preferably in about eight seconds after the tripping of the locking lever and pawl by the coin. The ratchet G⁴ is arrested, so that no further accurate operation of the pointer by the plunger D is possible until another coin has been deposited.

The weighted arm H³, the pawl 21, the ratchet 12, the fan 20, and the intermediate gearing between the ratchet and the fan constitute governor - controlled mechanism adapted to be set for action by the coin-controlled device, namely, the lever H, and acting when thus set to limit the time within which the coin-controlled mechanism is inactive.

It will be seen that the fan 20 constitutes a governor which, in consequence of the resistance of the air to its rotation, causes the desired limitation of the period of inactivity of the coin-controlled mechanism. The governor is of course always ready for operation, and the weighted arm H³ is raised by each coin inserted, so that the time-limiting mechanism is not dependent on a spring which requires to be wound, the said time limiting mechanism is therefore much simpler, less expensive, and less liable to derangement than any time-limiting mechanism which depends on a spring or other motor requiring to be set for action by a special mechanism provided for that purpose.

My invention is not limited to the particular form of governor-controlled time-limiting mechanism here shown, although this form is the simplest and best of any of which I am at present aware. It is obvious, however, that any other suitable form of governor-controlled mechanism may be provided for causing a relatively slow descent of a gravitating coin-controlled member, such as the pawl G⁵.

I claim,—

1. In a coin controlled apparatus, a ratchet wheel, speed governing mechanism connected therewith, a coin controlled lever pivotally mounted adjacent said ratchet wheel, a locking pawl, means carried by said lever for directly engaging said pawl to support the latter in inoperative position, and a second pawl carried by said lever and engaging said ratchet wheel.

2. In a coin controlled apparatus, a ratchet wheel, speed governing mechanism connected therewith, a coin controlled lever pivotally mounted adjacent said ratchet wheel, a locking pawl mounted in alinement with said lever, means carried by said lever for directly engaging said pawl to support the latter in inoperative position, and a depending pawl carried by one end of said lever and engaging said ratchet wheel.

In testimony whereof I have affixed my signature, in presence of two witnesses.

JAMES M. CHAPPEL.

Witnesses:
H. O. FISHER,
B. W. BROCKETT.

Copies of this patent may be obtained for five cents each, by addressing the "Commissioner of Patents, Washington, D. C."